April 19, 1960     D. D. TAYLOR     2,933,387

METHOD OF MAKING A VACUUM EVAPORATED STRAIN GAGE

Filed June 28, 1957

INVENTOR.
DUDLEY D. TAYLOR
BY
ATTYS.

2,933,387

METHOD OF MAKING A VACUUM EVAPORATED STRAIN GAGE

Dudley D. Taylor, Hyattsville, Md.

Application June 28, 1957, Serial No. 668,829

2 Claims. (Cl. 96—36)

(Granted under Title 35, U.S. Code (1952), sec. 266)

The invention described herein may be manufactured and used by or for the Government of the United States of America without the payment of any royalties thereon or therefor.

This invention relates to novel forms and improved methods for making electrical strain gages. More specifically, the present invention relates to the making of strain gages of small size for use at a high temperature.

The prior devices of this nature were usually constructed of small wire filaments, as illustrated in the Patent 2,626,338 to Mitchell. The art of making strain gages as films of deposited material is known, but it not generally commercially available. Such film deposited strain gages are taught in the Patent 2,621,276 to Howland.

In the application of strain gages it frequently becomes desirable to measure the strain at closely associated points. Such applications become important where the strain has a very high gradient as well as where the device is of very small dimension itself. It has also been noted that one of the properties of this method of construction of strain gages permits the standardizing of the resistance regardless of the size of the gage. That is to say the gage may initially be designed within relatively large dimensions and be constructed in that form to have a desired resistance for the gage. It may then be constructed in reduced size by the methods of this invention and will be found to have substantially the same resistance in the reduced size as it had in the larger size.

It is therefore an object of the present invention to construct a strain gage having a minute size, being appreciably smaller than gages constructed of the wire filament type.

A second object of this invention is to provide a method of constructing strain gages which produce gages having substantially the same resistance characteristics regardless of the size of the gage.

With these and other objects and views as will hereinafter more fully appear, and which will be more particularly pointed out in the appended claims, reference is now made to the following description taken in connection with the accompanying drawing in which:

Figure 1:
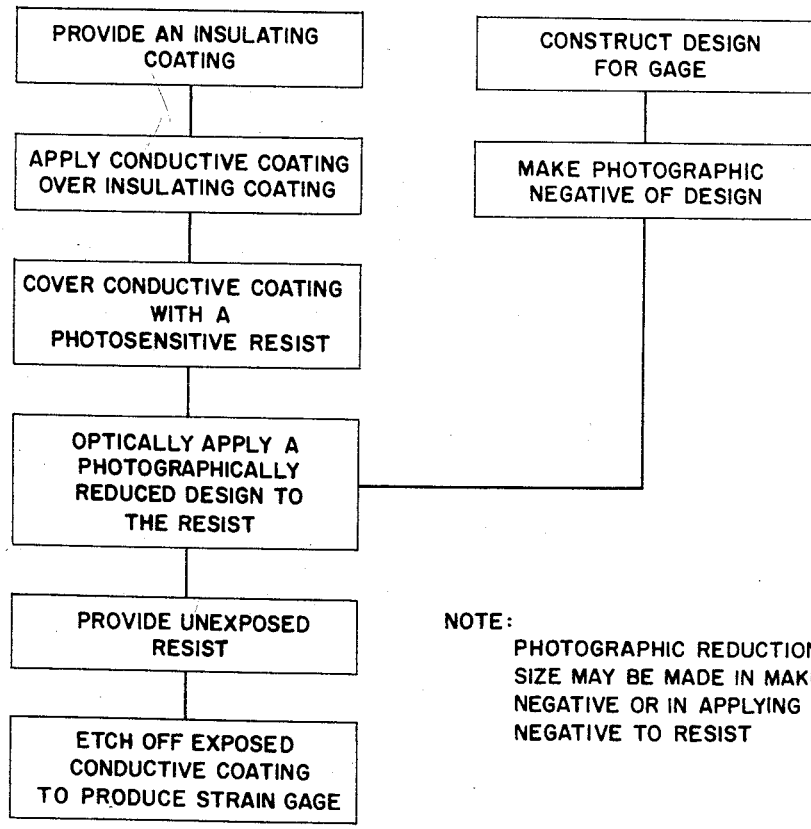
Fig. 1 is a diagram of the method of the present invention.

Referring now to Fig. 1 in which the steps of the method of the present invention have been diagrammed, it is noted that the first step in this process consists in providing an insulating coating. This coating may be generated directly on the object to be tested or may be a separate film of some insulating material on which the strain gage is to be formed. In applications where high temperatures are involved it has been found advantageous to apply the insulating coating directly to the object being tested because in high temperature applications the insulating materials, such as quartz, will stand up better as insulators under the conditions of service and lends itself to the evaporation technique. After providing the insulating coating, step 2 provides that a conductive coating of a particular material or alloy metals or it may be formed as an alloy in place on the material by simultaneously evaporating two metals and depositing them on this surface. These various methods of applying the metallic coating are suggested in the patent to Howland.

Figure 2:
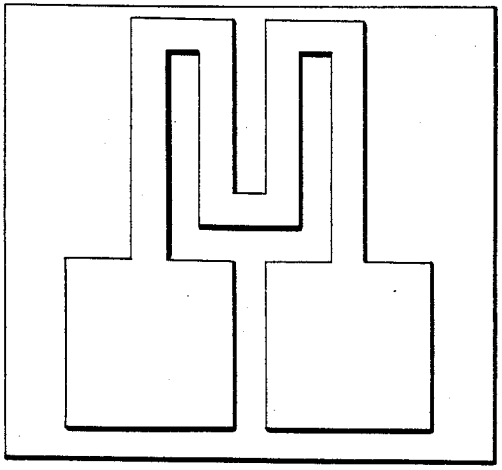
Fig. 2 is a planar view of an example of the gage produced by the present method drawn to an enlarged scale.

After applying the conductive coating, a coating of photosensitive material is applied over the conductive material. This photosensitive resist is then exposed to a pattern for the gage which has just been constructed in steps 4 and 5 and photographically reduced in size. This exposure to light hardens the resist material to form a protective coating over the conductive material in the pattern of the desired gage. It should be noted that steps 4 and 5 of the diagrammed method may be concurrent with the steps 1, 2 and 3 in time. Since it is the negative of the design which is applied to the photosensitive resist, it is possible after the exposure to remove the unexposed resist leaving only the gage design protected by the resist material. After removing the unexposed resist material the exposed layer of conductive coating is etched away by suitable etching solution to leave the desired pattern of the strain gage Fig. 2. It is then possible by using suitable chemicals to remove the hardened portion of the resist from the strain gage pattern to permit the attachment of the necessary lead wires. In the construction of gages of the type described in the foregoing descriptive matter, it is necessary that the conductive film have a very uniform thickness and be extremely thin to achieve the required resistance in the small dimensions of the gages. These desired results are achieved by the combination of the techniques disclosed herein of vacuum depositing films of the conductive material on a surface of insulating material suitable for the purpose such, for example, as vacuum deposited quartz, and the techniques of photo-etching employed in making printed circuits. Such a combination is desirable because the thinness of the insulating and conducting films deposited by the vacuum depositing methods prevents the formation of any undesirable cracks in the insulating coating under the conditions of service and any excessive undercutting when the etched technique is applied. This elimination of undercutting allows for the construction of these gages in very small sizes, of the order of $\frac{1}{32}''$ square.

The reproducibility of the gages constructed by this technique allows for the establishment of the gage factor, which is necessary for the utilization of the resistance element as a strain gage. Such reproducibility also lends the process of the present invention to the commercial production of these gages.

Various modifications are contemplated and may obviously be resorted to by those skilled in the art without departing from the spirit and scope of the present invention.

What is claimed is:

1. A method of producing a strain gage usable at a high temperature and comprising vacuum depositing a quartz coating on a surface to be strained, said coating being characterized by a chemical and electrical stability over a wide temperature range on the object to be gaged, said coating closely adhering to said object and subject to minute changes in size or position of said object, vacuum depositing an electrical conductive coating of uniform thickness on said quartz coating, coating said conductive coating with a light sensitive emulsion, constructing a pattern for said gage, photographically reproducing a reduced image of said pattern on said light sensitive emulsion, and removing the portions of the emulsion not covered by the reproduced image and that part of the conductive coating not underlying said image.

2. A method of producing a strain gage comprising vacuum depositing on the surface of an object a thin insulating sheet of quartz, characterized by chemical and electrical stability over a wide temperature range, vacuum depositing on said sheet a conductive coating of uniform thickness and composed of an alloy by simultaneously evaporating two metals, coating said alloy coating with a light sensitive emulsion, constructing a pattern for said gage, photographically reproducing a reduced image of the pattern on said emulsion, and removing the portion of the emulsion not defining said image and the alloy underlying said last-named portion.

References Cited in the file of this patent

UNITED STATES PATENTS 2,435,889    Kerridge  ---------------  Feb. 10, 1948